United States Patent [19]

Teague et al.

[11] 4,233,015

[45] Nov. 11, 1980

[54] EMPLOYING QUICKLIME IN STABILIZING EARTH

[76] Inventors: Joe D. Teague, 4813 Black Oak La., Fort Worth, Tex. 76114; Paul J. Wright, 1207 Sotogrande Blvd., Apt. 315, Euless, Tex. 76039

[21] Appl. No.: 969,421

[22] Filed: Dec. 14, 1978

[51] Int. Cl.$^2$ ............................................. E02D 3/14
[52] U.S. Cl. ................................... 405/263; 210/219; 366/168; 366/173; 366/174; 405/269
[58] Field of Search ............... 405/263, 266, 303, 258, 405/264, 269; 404/75, 76; 106/900; 366/168, 173, 174; 210/219

[56] References Cited

U.S. PATENT DOCUMENTS

| | | | |
|---|---|---|---|
| 2,680,602 | 6/1954 | Nelson et al. | 210/219 |
| 3,375,872 | 4/1968 | McLaughlin et al. | 405/264 |
| 3,971,222 | 7/1976 | Griffith, Jr. | 405/263 |
| 4,084,381 | 4/1978 | Cain et al. | 405/266 |

OTHER PUBLICATIONS

"Lime Slurry Pressure Injection Tames Expansive Clays" by P. J. Wright, Civil Engineering-ASCE, Oct. 1973.
"A Study of the Reaction Between Calcium Oxide and Water" by T. C. Miller, published by National Lime Association, Washington 5, D.C., pp. 12, 18.

Primary Examiner—Roy D. Frazier
Assistant Examiner—Alexander Grosz
Attorney, Agent, or Firm—Wofford, Fails & Zobal

[57] ABSTRACT

This specification discloses method and apparatus for treating subsurface layers of the earth to build strength and control movement of the subsurface layers and control movement of the subsurface water characterized by slaking quicklime (CaO) in a mixing tank to form an elevated temperature, hydrated lime [Ca(OH)$_2$] slurry and injecting the resulting elevated temperature lime slurry at a predetermined plurality of spaced apart locations and at predetermined depths into the earth subsurface layers. This achieves a cost reduction, has greater reliability in obtaining materials, achieves better results, saves energy and extends the injection-stabilization season into cold weather previously considered prohibitive. Also disclosed are the details of preferred embodiments for admixing the unslaked lime for the various uses.

11 Claims, 6 Drawing Figures

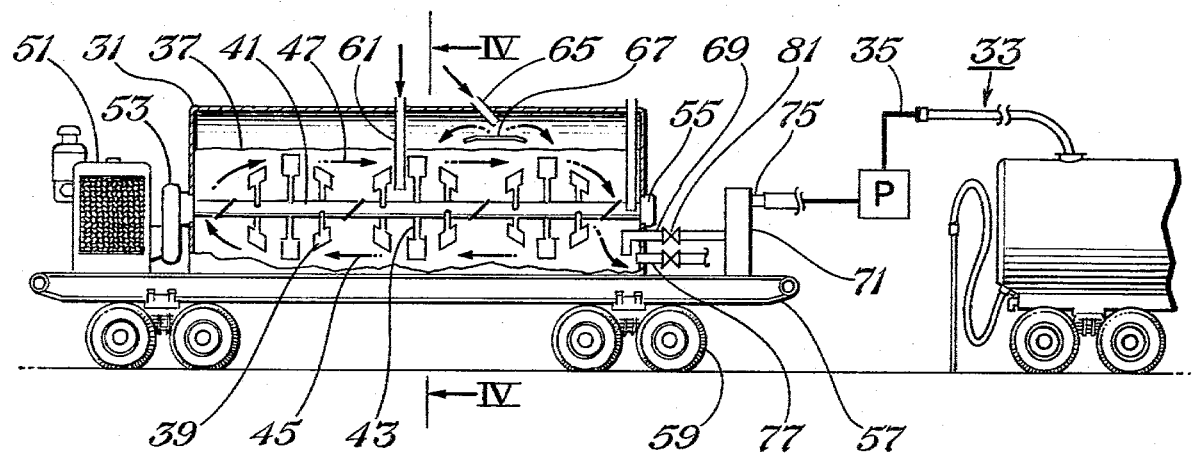
Fig.3
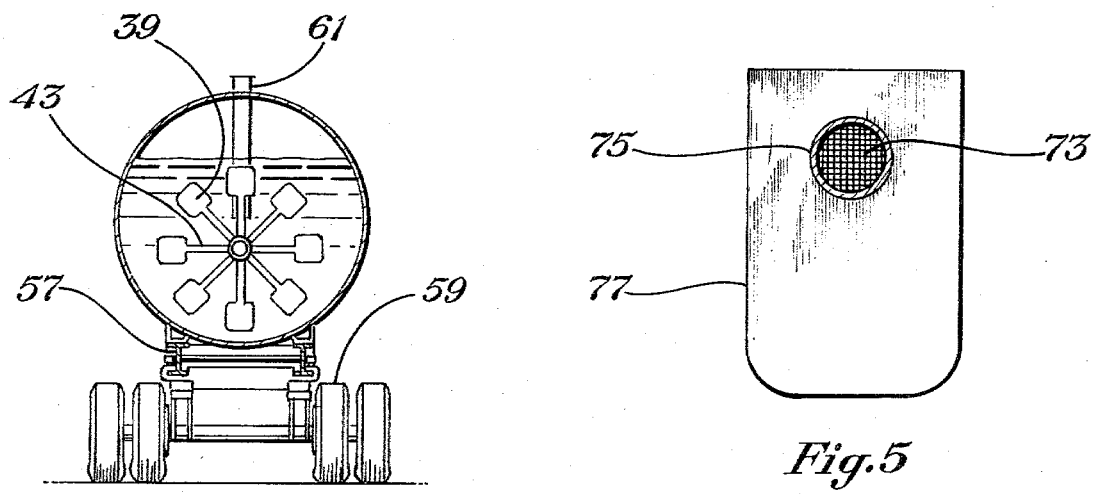
Fig.4
Fig.5
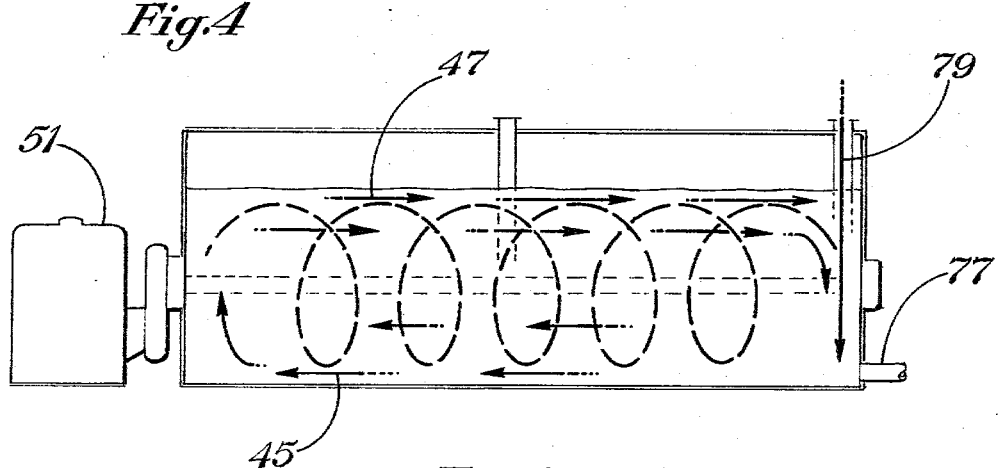
Fig.6

EMPLOYING QUICKLIME IN STABILIZING EARTH

BACKGROUND OF THE INVENTION

1. Field of the Invention

This invention relates to treating subsurface layers of earth adjacent, or near, the surface to reduce the volume change potential of clayey and silty soils and to build strength of the subsurface layers. More particularly, this invention relates to improving the subgrade; as for buildings, roadbeds, and the like.

2. Description of the Prior Art

The prior art is replete with a wide variety of materials that have been employed to stabilize soils, or improve subgrades in the subsurface layers adjacent the surface of the earth for a variety of purposes. The applications have been as varied as improving subgrades for building sites, streets, runways, railroads, dewatering projects and more recently, improving the slopes for preventing failure thereof. Of course, pretreating building sites for improving the strength and volume change characteristics of soils has long been a problem plaguing the civil engineer and the architectural engineer. The problems have been varied and the techniques have been varied to try to overcome them. Lime slurries have been worked into the top layers; for example, the top 6–36 inches in depth to improve and stabilize soils or subgrades. Other more exotic and expensive treatment, such as injection of furfural alcohols, that have been found to work in subterranean formations, have been tried. Such exotic treatments have proven too expensive and not altogether successful because the lack of metamorphosed rock in the subsurface layers adjacent the surface of the earth. Expressed otherwise, these exotic treatments were infeasible and engineeringly inoperable; because numerous small cracks, crevices and the like traversed through soil and because the soils were composed largely of sedimentary materials, amorphous materials, humous matter, non crystallographic materials and the like, that could not be consolidated as were the subterranean formation.

Chemical soil stabilization by injection of slurry has been a recent (last 15 years) development using slaked, or hydrated, lime, with or without additional material. Exemplary of such additional materials is the use of fly ash such as disclosed in our U.S. Pat. No. 4,084,381, issued Apr. 18, 1978 and entitled "Stabilization of Earth Subsurface Layers"; and the details of that patent are incorporated herein by reference for details that are omitted herefrom.

Two of the principle applications of this system are the stabilization of railroads and building sites, although the injection of the lime slurry has become increasingly more widely used in slope stabilization, landfill stabilization, dewatering, runway and street stabilization and remedial stabilization of existing structures, as by lifting foundations or the like.

Since the advent of the energy crisis, the price of hydrated lime has risen dramatically. Moreover, prices continue to rise steadily as this is a highly energydependent product. Furthermore, in certain parts of the United States, difficulty is frequently experienced in obtaining adequate quanities of hydrated lime (calcium hydroxide).

Thus it can be seen that the prior art has not been totally satisfactory in providing an economical process in which the starting materials were always available at an economical price.

One of the deficiencies of the prior art also has been the injection of the lime slurry, with or without additives in cold weather, or during the winter season, when ambient temperatures would cause the slurry to freeze either in the mixing tanks, conduits or pumps and the cold slurry would not react readily with the soils because full and final chemical reactions are temperature dependent.

SUMMARY OF THE INVENTION

Accordingly it is an object of this invention to provide method and apparatus that can be employed to stabilize subgrades more economically and employ more economical and readily available starting material, thereby obviating the deficiencies of the prior art.

It is a specific object of this invention to provide method and apparatus that are economical, employ economical, readily available starting material; achieves improved results; and extends the season of operability by allowing injection in cold weather.

These and other objects will become apparent from the descriptive matter hereinafter, particularly when taken in conjunction with the appended drawings.

In one embodiment of this invention, there is provided a method of treating subsurface layers of the earth to reduce the volume change potential of clayey soils thereof by controlling movement of subsurface water and build strength in the subsurface layers, characterized by admixing in a slurry mixing tank quicklime (CaO) and water to form an elevated temperature, hydrated lime [$Ca(OH)_2$] slurry; and (b) injecting the lime slurry at a plurality of predetermined, spaced apart locations and at a plurality of depths such that the subsurface layers are treated in situ to obtain added strength and to reduce the swell potential. In the preferred embodiment, the particulate solids are in the slurry within a range of 20–60 percent by weight of the water.

In another embodiment of this invention there is provided apparatus for injecting the slurry containing the lime and including injection apparatus and interconnecting conduits and an improvement characterized by:

(a) mixing tank having predetermined water level to which water is filled before admixing with the unslaked lime;

(b) mixing means for admixing the lime particles into the water;

(c) means for heating the water in order to speed slaking of the quicklime;

(d) means for adding quicklime to the water in the mixing tank;

(e) suction line for connecting with the injection equipment;

(f) screening means connected serially with the suction line for screening out large solid particles that are not efficacious in the injection process.

In the preferred embodiment of the apparatus the mixing means comprises:

(a) spirally arranged paddles sloped to pull the lime particles along the bottom of the mixing tank toward one end and affixed to a rotatable shaft; and (b) rotating means for rotating the shaft; the rotating means being connected with the shaft;

the means for heating the water employs the exothermic slaking reaction for the heating and includes, for example;

(c) first inlet conduit extending for a second predetermined distance below the predetermined water level for admixing the quicklime below the water level to heat the water and to form a hot dilute lime slurry;

the means for adding the quicklime include:

(d) second inlet conduit and foraminous, or perforated, baffle for blowing the quicklime into and forwardly and rearwardly onto the surface of the lime slurry.

Ordinarily, the CaO is available in pellet form and is transferred pneumatically into the slaking, or mixing tank which contains the desired quantity of water.

BRIEF DESCRIPTION OF THE DRAWINGS

FIG. 3 is a partial cross sectional view, partly schematic, illustrating a mixing tank for slaking the quicklime in water and injecting the resulting hydrated lime slurry in accordance with this invention.

FIG. 4 is a cross sectional view taken along the lines IV—IV of FIG. 3.

FIG. 5 is a front end view of the screening apparatus of FIG. 3.

FIG. 6 is a schematic illustration showing the mixing pattern of the embodiment of FIG. 3.

DESCRIPTION OF THE PREFERRED EMBODIMENTS

Figure 2:
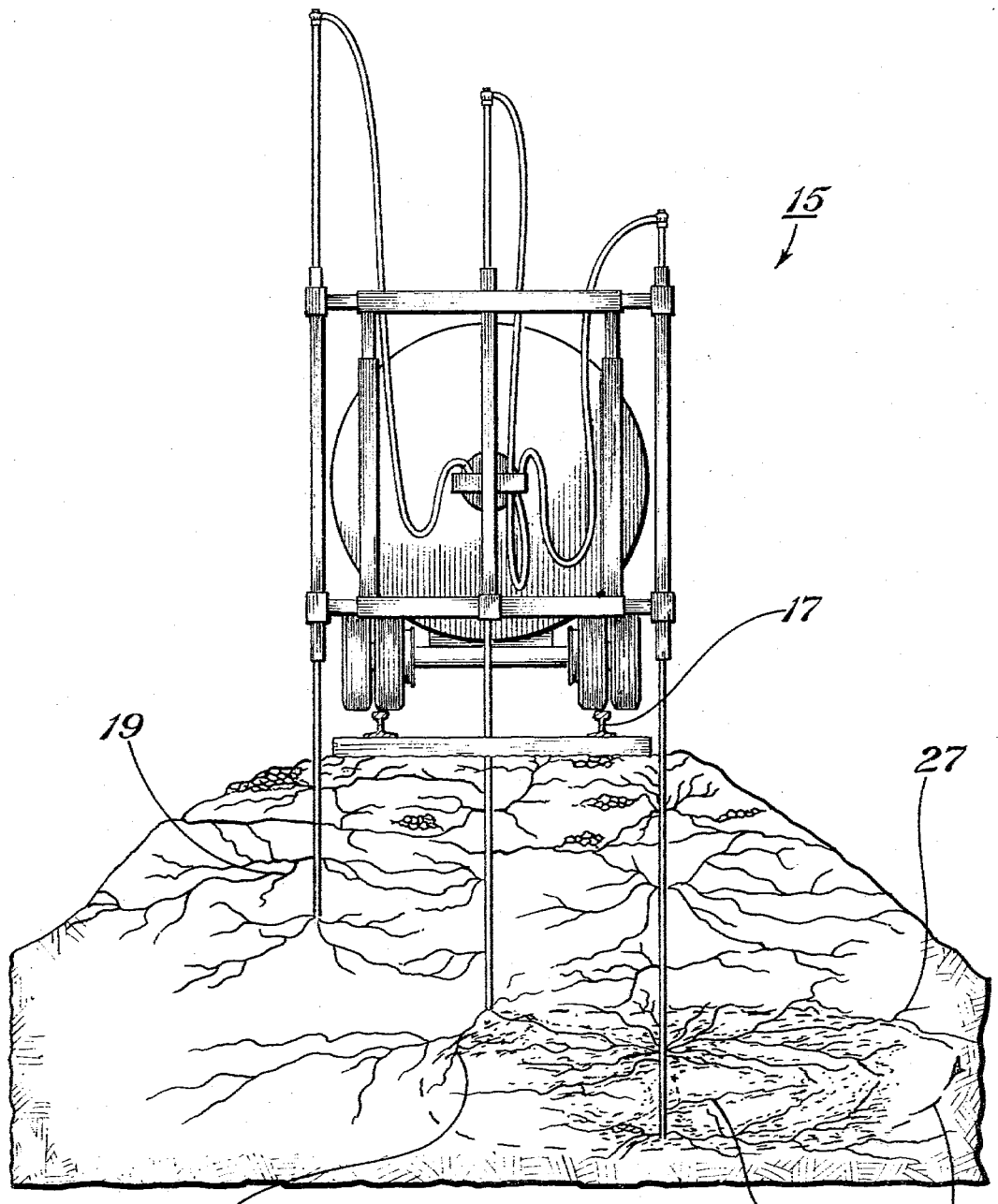
FIG. 2 is a partial cross sectional view of a railroad track having a slurry containing water and lime and formed in accordance with this invention being injected to form in situ masses along a railroad track.

As indicated hereinbefore and as will become clear later hereinafter, this invention can be employed in a wide variety of circumstances for improving the subsurface layers by either or both reducing the volume change potential and building the strength of the subsurface layers.

Water that is employed in the slurry that is injected into the subsurface layer may be any of the water from economical and normally employed sources. Usually, the job will be close enough to the conventional water supply that the conventional source of water can be employed. A conventional source may comprise city water mains, railroad storage facilities, highway department storage facilities, lakes, streams, and the like. Preferably, the water will not have a high concentration of materials that will react with the lime that will be added in the slurry.

The lime that is employed in the slurry in accordance with this invention is a conventional quicklime, or calcium oxide. The quicklime may be either dolomitic or high calcium lime; although the high calcium lime is normally used. The lime that is employed may have minor amounts of other impurities therein but will ordinarily analyze better than 90 percent by weight calcium oxide. The more nearly it analyzes toward 100 percent calcium oxide, the better are the results.

The quicklime is ordinarily available in the form of small pellets (approximately ¼"–½") and is easier to unload than hydrated lime and causes less dusting.

Care has to be taken when slaking the quicklime to achieve proper slaking and breakdown of the lime and to avoid hazard to workmen and the like. These precautions and procedures will be discussed in more detail later hereinafter.

One of the reactions that occurs when the lime slurry is injected into subsurface layers, or soils, is a pozzolanic or cementing action in which the calcium hydroxide interacts with siliceous and aluminous components of the soil to increase strength of the soil. The resulting reaction products are water insoluble and render the fissures that formerly served as flow paths impervious to subsurface flow of water or moisture. In addition, the materials that are formed stabilize the soils, reducing their volume change potential through cation exchange and moisture control as well as to increase the strength. To help the slurry penetrate further into the small interstices of the subsurface layers, it is preferable to employ a surfactant.

The surfactant that is employed in the slurry is preferably a nonionic type surfactant, although the cationic and anionic type surfactants can be employed. The nonionic surfactants are usually the polyethylene oxide surfactants. By polyethylene oxide surfactants is meant a surfactant molecule in which the polyethylene oxide groups are combined in an average number with a moiety that is selected from the class consisting of alkyl or alkyl aryl type moiety. Illustrative of the alkyl type moieties are the hydrocarbon moieties having six to sixteen carbon atoms. Illustrative of the alkyl aryl moieties are the alkyl groups having six to twelve carbon atoms combined onto a phenyl ring, alone or with other substituents. A typical nonionic surfactant is nonyl phenol with an average from either to one hundred mols of ethylene oxide associated with each mol of nonyl phenol. Typically, an average of about 9 to 30 mols of ethylene oxide will be associated with each mol of nonyl phenol. If desired, of course, the octa'-, heptyl-, or hexyl- moieties may be associated with the phenol and employ from eight to one hundred mols of ethylene oxide in association therewith, depending upon the hydrophilic versus hydrophobic characteristics desired.

The nonionic surfactant that has been found particularly useful is the Wet-It surfactant, Chemical Research, Inc., Dallas, Tex.

As indicated, the anionic surfactants such as sodium lauryl sulfate and the cationic surfactant such as cetyl pyridinium chloride can be employed if desired.

The surfactant may be employed in a concentrated form or may be diluted and applied in an aqueous solution, the latter facilitating forming the slurry.

In the slurry of this invention, the particulate solids, such as the lime, are present as particulate solids in a proportion within a range of 20–60 percent by weight of water. Of course, any range can be employed as desired and the proportions vary widely depending upon the application, the soil needs and the like. For example, where the slurry will be employed as a grout, raising slabs, or grouting deep ballast pockets below railroad tracks, the solids may be proportioned in the range of about 40–60 percent by weight of the water; whereas when they are employed for stabilization of building sites and the like, the solids may be proportioned in the range of about 20–40 percent by weight of the water.

The surfactant, when employed, is employed in a concentration of at least 0.001 percent by volume; preferably at least 0.01 percent by volume. The best concentration of surfactant that has been achieved is in the range of 0.01–1.0 percent by volume of the slurry; for example, about 0.03 percent by volume of the slurry. Expressed otherwise, the liquid surfactant is employed in a proportion of about 1 part to about 3500 parts of slurry when the liquid is undiluted surfactant.

The remainder of the slurry is water.

In operation, the injection portion of this invention is performed similar to the lime slurry injection described by one of the inventors in a series of publications as follows:

"Lime Slurry Pressure Injection Tames Expansive Clays", Paul J. Wright, CIVIL ENGINEERING-CE, October, 1973.

"Lime Injection Production Equipment and Techniques", Paul J. Wright, ROADBED STABILIZATION AND LIME INJECTION CONFERENCE, Little Rock, Ark., University of Arkansas and the Federal Railroad Administration, August, 1975; and "Roadbed Stabilization by Lime Slurry Injection", RAILWAY TRACK AND STRUCTURES, October, 1975, an address presented at the LIME INJECTION CONFERENCE.

Injection rigs were developed to inject the lime slurry into the ground without requiring pre-drilled holes, although the drilling of the holes and injecting by way of the holes can still be performed if desired. Ordinarily, the slurry will be injected in a pre-patterned array or holes at predetermined spacing in the neighborhood of from 1 to 10 feet apart. For example, it has been found that injection on 5 foot centers in both lateral and longitudinal directions affords a good interlacing injection pattern that accomplishes the objectives.

Before the injection actually takes place, however, several soil samples are taken to determine the best slurry to be employed based upon compatibility tests that are run with the sample. Several approaches have been employed, but the preferred one is to remold the soil samples, then after curing they are soaked in water for twenty-four hours and tested with a pocket penetrometer. Comparison of the control sample with the sample that has been treated with the slurry, alone or in various combinations and concentrations, gives an idea of how reactive the soil is with the respective slurries. This simple test in no way is intended to replace the need of consulting with independent soil testing laboratories and engineers, but is done as a safeguard to insure that the injection program is appropriate for the site.

After this determination is finished, one or two bulk mixing tanks are placed on the job as close as possible to the site, or area, where the injection is to be made. The mixing tanks are also preferably located near water and an all weather road surface so that bulk quicklime deliveries can be made regardless of the weather. The mixing tanks may be of any size. We have employed ten foot by thirty foot tanks. This size allows mixing an entire load of solids at one time, assuring a uniform mixture for each load. As will become apparent from the descriptive matter later hereinafter, each of the slurry tanks is equipped with mechanical agitators to form a more nearly uniform slurry than would otherwise be possible.

In some instances, the bulk slurry tank can be positioned next to a railroad track where the slurry is to be pumped directly along a railway subgrade. If this is not possible, 4000 gallon transports are employed to deliver the slurry to rail mounted injection equipment if it is to be injected along the railway.

The injection truck is a self-contained unit equipped with 2000 gallon slurry tank, high pressure pump, engine and three injectors at predetermined spacing and capable of making continuous penetrations up to twenty feet or more in depth. With optimum planning and disposition, 500 to 600 track feet per day of railroad can be injected with a single mixing tank or 600-800 track feet per day with two mixing tanks. Ordinarily, a rail and standardly equipped injection truck can also double for injection on a site not along a railway; however, for this application the injections are unusually accomplished by using modified fork lifts capable of making up to four simultaneous injections to depths of 10 or more feet. The injection is carried out; for example, at 5 foot spacings over the area to be injected. The lime slurry is forced into the crevices and out into the soil through the injector; which may be, for example, 1⅜ inches in outside diameter. The slurry containing the lime is distributed in a 360 degree radius from the injection hole. The injection is ordinarily carried out at one or more predetermined depths along the injection hole; for example up to 10 feet in depth. Injections are made incrementally on the way down, each injection being to refusal point in each increment. By refusal point is meant the point at which the soil will not take any more lime without the pressure exeeding the rupture pressure of the soil at the particular depth. In most soils each incremental level is separated from 18 to 24 inches in order to get a seal to be able to pump more slurry into the soil.

As previously mentioned hereinbefore, the chief culprit in subgrade instability is water. Excess water in a subgrade usually manifests itself in problems referred to variously as "soft track", "pumping", "squeezes", "slides", "slope failures", and "out of face track". The water may penetrate the subgrade from surface rain, by capillary rise from below and from lateral movement, expecially in areas of side hill cuts. Water is easily trapped in the soil if the grade changes; and improper drainage results in excessive soaking of the subgrade. Along railroad tracks there are deep ballast pockets that resemble bathtubs up to 10 or even 18 feet in depth. The water creats a soggy unstable subgrade into which the ballast sinks as rapidly as it is applied so it is substantially impossible to stabilize the railroad track for any extended period of time with this pocket of water held in place. Heretofore, advent was had to putting the track out of service and digging out the deep ballast pockets. This was a very time consuming and expensive procedure, both from the direct expense and indirect expense points of view.

This invention is advantageous in that the lime slurry can be injected to displace the water from these pockets whether or not they be relatively minor pockets or deep ballast pockets. The lime slurry then begins its cementing action and sets up. Particularly with this invention, where the slurry is at an elevated temperature when injected, the setting up of the reaction products is done more rapidly and prevents re-entry of water and builds a strong stable subgrade. These reaction products or seams add strength to the fractured area of the soil mass, in addition to controlling the flow of water through the subgrade. Many times during injection, clear water will be observed flowing out the side of a roadbed at the bottom of a fill as the water is replaced by the lime slurry.

Figure 1:
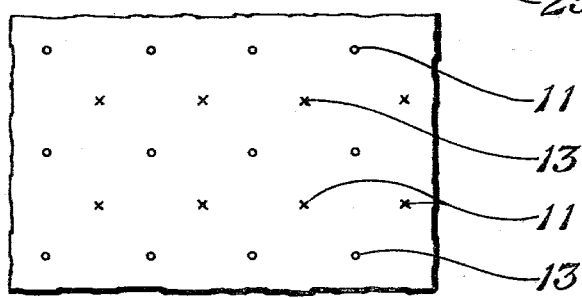
FIG. 1 is a partial plan view of an injection pattern for staged injections, the initial injection being in a substantially square pattern and subsequent injection being at diagonally intermediate locations.

The lime slurry is injected as described herein and in the prior publications. After one to several days to allow time for initially injected slurry to set and partially cure, a second set of injections may be made with the lime slurry. Ordinarily, to complete a job the second injection will be made at the same spacing but off-set intermediate the other holes; for example, at 5 foot intervals spaced 2½ foot center line spacing off of the original 5 foot spacing and at the midpoint diagonally between the preceding injection holes. As illustrated in FIG. 1, the initial injections may be made at injection points 11 (shown in the circles) with subsequent, staged injection being at points 13 (shown in X's).

In the injection along the railroad track, the holes may be aligned along the longitudinal axis of the track, or off-set by 2½ feet. As illustrated in FIG. 2, the injection apparatus 15 may be rolled along the railroad track 17 to inject the slurry of water and lime, with or without surfactant and other additives, into relatively shallow injection locations 19, intermediate depth locations 21 or deeper locations 23. The injected masses of the slurry ultimately form injected masses and reaction products that are disposed in numerous fissures 27 and in ballast pockets shown by dashed lines 29. As indicated hereinbefore, these ballast pockets 29 may initially occur below the surface of the track, but eventually may extend to the surface such that they become sinks for the ballast if not treated by a method such as a method of this invention.

If the injection is made along a slope to stabilize the slope against slides and the like, a stage of injection may be along the toe of the slope first, then moved upwardly along the face and finally along the top of the slope. The injection may be in staged injection as described hereinbefore.

On some slopes, the injection may be made from the top downwardly along the slope. If desired individual injections can be made at depths up to 50 feet deep by adding to the injection pipes, or injectors.

In any event, the injected lime slurry displaces the water from the soil, controls flow of water through the soil, reacts to cement together constituents and form a high strength, water impervious subsurface layer that is beneficial in controlling the flow of water and building the strength of the soil.

As implied hereinbefore, with this invention, there are special procedures and special equipment necessary to effect admixing of the quicklime with the water to form the lime slurry that is ultimately injected into the subsurface layers. Referring to FIG. 3, there is illustrated a mixing tank 31 in which the quicklime is admixed with water to form the hydrated lime slurry that is ultimately injected by the injection equipment 33. The injection equipment 33 is connected, as by way of interconnecting conduits 35 with the mixing tank 31 directly or by way of intermediate transport trucks, depending upon the size and circumstances, as indicated hereinbefore. The mixing tank has a predetermined water level 37 to which the water is filled before the quicklime is added. In the illustrated embodiment where a ten foot tank is employed, the water level may be in the range of 5-7 feet; for example, about 6 feet. This proportion of filling of a mixing tank, regardless of size has been found to be operable without creating hazards. Interiorly of the mixing tank are a plurality of mixing paddles 39 arranged in at least one spiral. As illustrated, the mixing paddles are arranged in two spirals, one on each side of a rotatable shaft 41 to which they are connected by suitable arms 43. The paddles 39 angle so as to cause the particles of lime to flow along the bottom, as shown by the arrows 45, and spirally intermix with the water, causing a return flow along the top, as shown by arrows 47. The paddles may be mild steel or any other suitably strong material and may be used in combination with flexible paddles; such as plastic, Neoprene, or other synthetic rubber, or belting having rubber around heat resistant fibers, like fiber glass fibers or the like. It is necessary that they be able to withstand temperatures near the boiling point of water because of the heat that will be engendered by the exothermic reaction of slaking the quicklime by admixing the quicklime with the water. A rotation means, such as engine 51 and gear box 53, are employed to rotate the shaft 41 and, consequently, the paddles 39. A rotational speed in the range of 30-90 revolutions per minute (RPM) has been found to be satisfactory. The shaft 41 is journaled in suitable bearings 55 mounted in each end of the mixing tank 31. As illustrated, the mixing tank 31 is mounted on skids 57 as well as having its own wheels 59 to facilitate portability.

Referring to FIGS. 3 and 4, a first inlet conduit 61 is provided in the top of the mixing tank and extends for a predetermined distance below the predetermined water level 37 for admixing the quicklime below the level of the water to form a hot dilute lime slurry. For example, the quicklime pellets may be sent from a hopper through the inlet conduit 61 or blown through suitable pneumatic transport conduits into the inlet conduit 61. It has been found advisable to keep workmen off the tank during the admixing of the quicklime, since the temperature rapidly climbs. Earlier attempts to admix the quicklime formed cakes on the top of the water and steam below the cake such that there was blowing upwardly of the cakes with the resultant danger to personnel and equipment. This has been obviated by the entry of the quicklime below the surface of the water, in conjunction with the spiralling paddles to give a mixing flow and configuration such as illustrated schematically in FIG. 6.

There is provided a second inlet conduit 65 and a foraminous, or perforated, baffle 67 for distributing the quicklime into and forwardly and rearwardly onto the surface of the dilute hot lime slurry initially formed. This allows more rapidly completing the mixing of the quick lime to form the desired final slurry.

A suction line 69 is provided for connecting with the injection equipment by way of the interconnecting conduits 35.

A screening means such as the screen chamber 71 is connected serially into the suction line for screening out solid particles that did not slake and that are not efficacious in the injection process. Specifically, the screen chamber 71 has a metallic screen 73 over the effluent conduit 75 to trap the larger solids so they can be removed from the screen chamber 71.

If it is desired to bypass the screen chamber 71, a suction conduit 77 may be provided. As can be seen in FIG. 6, the suction conduit 77, or the conduit 69, has an air line 79 terminating adjacent the entry thereinto for blowing away debris and the like that would tend to block the entry to the suction conduit. Valves such as valves 81 were employed on the suction line to prevent stopping up the suction lines during the slaking process.

In the admixing of the quicklime to form the lime slurry, the mixing tank 31 has water added to a predetermined water level to achieve the desired mixture.

The quicklime is added initially through the inlet conduit 61. The inlet conduit 61 may terminate about one foot to two feet; for example, about 18 inches; below the water level in order to get the quicklime into the water without forming caking on the surface of the water. The quicklime that has been introduced into the water is stirred into the water to slake and admix with the water to form a hot dilute lime slurry. The stirring forms a more nearly uniform distribution of the quicklime and the temperature throughout the slurry than would otherwise be possible. The quicklime is added through the inlet conduit 61 (while simultaneously stirring the slurry and entering quicklime as described hereinbefore) until the hot dilute slurry reaches a first temperature in the range of 140-160 degrees Fahrenheit (°F.), 60°-71° C. Thereafter, the quicklime is injected more rapidly through the second conduit 65 and is spread forwardly and rearwardly, as well as directly on the top of the hot dilute slurry, by the foraminous baffle 67. Thorough mixing is continued to prevent forming a dangerous crust and steam build-up until the desired proportion of lime is formed in the final slurry. Specifically, the rotating shaft and paddles causes the mixing pattern illustrated in FIG. 6. The temperature may climb to as much as 195° F. or more in the mixing tank.

After the quicklime has slaked and formed an elevated temperature lime slurry, it is subsequently injected into the site desired, as described hereinbefore.

One of the particular advantages of this invention is that the elevated temperature lime slurry can be injected and become efficacious even in cold seasons and in relatively cool earth formations that would not have been conducive to the cementing action of the cold slurries of the prior art. Specifically, injections of the lime slurries in the prior art that would not have been conducive until the temperature had increased. For example, at temperatures below about 40° F., there is very little cementing action such as is desired in accordance with recognized injection criteria. With the elevated temperature lime slurry of this invention, however, there is substantially immediate cementing action, even in winter weather and especially in warmer seasons. Many researchers in lime stabilization have recognized that lime reactions are temperature dependent and that higher temperatures produce better reactions.

One of the advantages of this invention is that quicklime is not only more economical and more readily available but forms a larger quantity of the slaked lime. Depending upon the source of lime there is a conversion factor of about 1.20 to 1.25. For example, about 30,000 pounds of quicklime will produce about 40,000 pounds of hydrated lime, increasing the economic advantages of this invention. Heretofore, it was deemed infeasible and too hazardous to try to slake quicklime outside of specially constructed slaking plants and in a mixing tank as is done in this invention.

The following examples illustrate applications of this invention.

EXAMPLE I

A small test tank was equipped with agitators for mixing the slurry and keeping lime in suspension. The temperature of the water in the test tank was 76° F. Quicklime was added and the temperature rose rapidly to 163° F. It was found that the pebble quicklime would react quickly when added to the water. Other admixing was done and the temperatures varied from about 160° F. to as much as 196° F.

Because of the elevated temperatures several equipment changes were initiated to improve the safety of the operation. For example, hoses to the injection units were brought into the rear of the units behind the operator such that the hot fluid would not scald the operator in the event of a break. Pipe, instead of hose, was used on the vehicles to get the slurry to the injection pipes for safety to personnel. No personnel were allowed to climb on the tank during the mixing or get near one of the man holes while the quicklime was being slaked.

EXAMPLE II

Following the success of mixing the quicklime in the portable mixing tanks, an actual injection into soil was performed. A load of 15 tons of quicklime was slaked to produce an equivalent yield of 20 tons of hydrated lime. In this admixing operation, however, water was first added to the tank and the quicklime added below the surface of the water. In the event that additional water had to be added, the lime was stopped until the water was added and thoroughly mixed.

The slurry that was formed produced a temperature hot enough to blister the paint from the mixing tank since it was not a heat resistant paint. The next day the slurry was injected into the soil. The slurry was still very hot (approximately 150° F.) and injections went as normal except for some line stoppage due to rocks (unslaked pebbles) in the slurry. A rock trap, such as the screen chamber 71, was put into the suction line and screened out the rocks and debris that fouled the pumps and injection lines. Quick disconnect type connections were employed to enable quickly and safely disconnecting the lines and emptying the rock trap.

Satisfactory results were observed following the injection, as well as during the mixing and injecting stages.

EXAMPLE III

Another load of quicklime was slaked. Initial water temperature was 84° F. After mixing the temperature went to 196° F.

A day later, the temperature was 160° F. and on the following day the temperature was 158° F. It was during this series of mixings that it was found desirable to employ the initial below water mixing with a second stage of admixing in which the lime was blown in at approximately 15° angle over a perforated baffle that was designed to distribute the lime to prevent build-ups in any given area. Also, the mixing tank agitators were redesigned to have a large center shaft with paddles arranged to create a spiral conveyor to move the slurry from one end along the bottom to the other end and return slurry along the top toward the one end during slaking. Flexible, heat resistant wipers including rubber were added to the paddles to create wiping action and prevent build-up on the inside of the tank. The rubber wipers preferably are of the belt type in which heat resistant fibers are included. It was found desirable to employ a valve just outside the tank on the suction lines, since otherwise the suction line would be stopped up during the slaking process.

From the foregoing it can be seen that this invention achieves the objects delineated hereinbefore. Specifically, it provides the following advantages:

1. There is a cost savings in that approximately 15 tons of quicklime can be used in lieu of 20 tons of hydrated lime. 2. There is ready availability. In many instances hydrated lime was not available at certain times of the year and certain locations, whereas quicklime is nearly always available.

3. There is extended working season. Work in certain parts of the United States had to be discontinued early in the Fall due to cold weather. Elevated temperature slurry will extend that season. Moreover the elevated temperature slurry provides faster chemical reaction and will help insure a full reaction.

4. Raw material is easier to unload. Much of the work is in stabilizing existing railroads. Many times the lime has to be unloaded from railroad hopper cars. Hydrated lime is difficult to unload due to its critical angle of repose. Quicklime is in the form of pellets and is much easier to unload.

5. This invention achieves improved quality, because of faster reactions in the soil, due to the elevated temperature of the slurry.

Having thus described the invention, it will be understood that such description has been given by way of illustration and example and not by way of limitation, reference for the latter purpose being had to the appended claims.

What is claimed is:

1. A method of treating subsurface layers of earth for controlling movement of subsurface water and building strength of the subsurface layers comprising the steps of:
  a. admixing in a slurry mixing tank unslaked lime called quicklime and water to form a hot hydrated lime slurry at elevated temperature above ambient temperature; and
  b. injecting said hot lime slurry before cooling below ambient temperature and at an elevated temperature above ambient at a plurality of predetermined, spaced apart locations and at a plurality of depths such that said subsurface layers are treated in situ to obtain added strength and to obtain stabilized moisture content.

2. The method of claim 1 wherein the admixing of step (a) is performed by adding water to a predetermined level in said mixing tank; initially adding the quicklime at a second predetermined distance below the surface of said water in said mixing tank while simultaneously stirring said water and quicklime to obtain a more nearly uniform distribution of said quicklime and temperature throughout than would otherwise be obtained to assure maximum slaking; continuing said adding of said quicklime below the surface of said water and mixing until the temperature has increased to within the range of 140–160 degrees F. to form a hot dilute slurry; and, thereafter, injecting said quicklime more rapidly into, and onto both forward and rearward portions of, the surface of said hot dilute slurry and thoroughly mixing to prevent forming dangerous crust and steam build-up, until the desired proportion of lime is formed in the final slurry.

3. The method of claim 1 wherein said admixing of step (a) is performed by adding water to a predetermined level in said tank; and at least initially adding the quicklime at a second predetermined distance below the surface of said water in said mixing tank while simultaneously stirring said water and quicklime to obtain a more nearly uniform distribution of said quicklime and temperature throughout than would otherwise be obtained to secure maximum slaking of the quicklime.

4. A method of treating subsurface layers of earth for controlling movement of subsurface water and building strength of the subsurface layers comprising the steps of:
  a. admixing in a slurry mixing tank unslaked lime called quicklime and water and including the step of at least initially adding said quicklime at a predetermined distance below the surface of the water in the mixing tank while simultaneously stirring the water and quicklime to obtain a more nearly uniform distribution of said quicklime and temperature throughout than would other-be obtained to assure maximum slaking and form a hot hydrated lime slurry at the elevated temperature above ambient temperature; said final slurry being passed through a screen for removing unslaked limestone particles that are not efficacious in an injection procedure before the final slurry is injected; and
  b. injecting said hot lime slurry before cooling below ambient temperature and at an elevated temperature above ambient at a plurality of predetermined, spaced apart locations and at a plurality of depths such that said subsurface layers are treated in situ to obtain added strength and to obtain stabilized moisture content.

5. The method of claim 4 wherein said mixing is performed by a plurality of paddles arranged in at least one spiral and affixed to a power shaft for rotation to pull the particles of slaked and unslaked lime along the bottom of said mixing tank toward one end and effect a return of slurry along the top of the slurry toward the other end for nearly uniform admixture.

6. The method of claim 4 wherein an air conduit is provided adjacent the suction lines from the mixing tank for unstopping the suction lines by blowing debris from the entry thereinto.

7. The method of claim 4 wherein said injecting of step (b) is carried out while said final slurry is hotter than the temperature in the subsurface layer.

8. In an apparatus for injecting slurry containing hydrated lime and water and including injection apparatus and interconnecting conduits, the improvement comprising:
  a. a mixing tank having a predetermined water level for filling to said level with water before making the slurry;
  b. mixing means for admixing into the water lime particles, both quicklime and hydrated lime that results from slaking of the quicklime;
  c. means for heating the water in order to speed slaking of quicklime;
  d. means for adding quicklime to the water in the mixing tank;
  e. suction line for connecting with said injection equipment and disposed adjacent the bottom of said mixing tank; and
  f. screening means connected serially with said suction line for screening out large solid particles that are not efficacious in the injection process.

9. The apparatus of claim 8 wherein said means for adding the quicklime to the water in the mixing tank includes a conduit extending for a second predetermined distance below said predetermined water level for admixing the quicklime below the water level to form an elevated temperature dilute lime slurry and said means for heating the water employs the exothermic slaking reaction of the quicklime to elevate the temperature for maximizing the slaking of the quicklime rapidly.

10. In an apparatus for injecting slurry containing hydrated lime and water and including injection apparatus and interconnecting conduits, the improvement comprising:
  a. a mixing tank having a predetermined water level for filling to said level with water before making the slurry;
  b. mixing means for admixing into the water lime particles, both quicklime and hydrated lime that results from slaking of the quicklime; said mixing means comprising:
  i. spirally arranged paddles so sloped as to pull along the bottom of the mixing tank toward one end the particles of lime; said paddles being affixed to a rotatable shaft; and
  ii. rotating means for rotating said shaft; said rotating means being connected with said rotatable shaft;
c. means for heating the water in order to speed slaking of quicklime;
said means for heating the water comprising the exothermic slaking reaction and including first inlet conduit extending for a second predetermined distance below said predetermined water level for admixing the quicklime below the water level to form an elevated temperature dilute lime slurry;
d. means for adding quicklime to the water in the mixing tank;
the means for adding the quicklime including second inlet conduit and formainous baffle for distributing said quicklime into and forwardly and rearwardly onto the surface of the hot dilute lime slurry after it has been formed, until a final elevated temperature lime slurry is formed;
e. suction line for connecting with said injection equipment and disposed adjacent the bottom of said mixing tank; and
f. screening means connected serially with said suction line for screening out large solid particles that are not efficacious in the injection process.

11. The apparatus of claim 10 wherein an air conduit is inserted in said mixing tank and terminating adjacent the entry to said suction line for blowing debris therefrom for unstopping in the event it becomes partially blocked.

* * * * *